US012013990B2

(12) United States Patent
Noguchi

(10) Patent No.: US 12,013,990 B2
(45) Date of Patent: Jun. 18, 2024

(54) STYLUS COMMUNICATING WITH A DEVICE

(71) Applicant: HUAWEI TECHNOLOGIES CO., LTD., Guangdong (CN)

(72) Inventor: Koji Noguchi, Yokohama (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/148,134

(22) Filed: Dec. 29, 2022

(65) Prior Publication Data

US 2023/0133003 A1  May 4, 2023

Related U.S. Application Data

(63) Continuation of application No. PCT/CN2020/100071, filed on Jul. 3, 2020.

(51) Int. Cl.
*G06F 3/0354* (2013.01)
*G06F 3/038* (2013.01)
*G06F 3/041* (2006.01)
*G06F 3/044* (2006.01)

(52) U.S. Cl.
CPC ........ *G06F 3/03545* (2013.01); *G06F 3/0383* (2013.01); *G06F 3/04162* (2019.05); *G06F 3/0441* (2019.05); *G06F 3/0442* (2019.05); *G06F 3/0448* (2019.05)

(58) Field of Classification Search
CPC .. G06F 3/04162; G06F 3/0448; G06F 3/0441; G06F 3/03545; G06F 3/0383; G06F 3/0442
See application file for complete search history.

(56) References Cited

U.S. PATENT DOCUMENTS

| 10,007,364 | B2 | 6/2018 | Zimmerman et al. |
| 10,101,828 | B2 | 10/2018 | Kaplan |
| 2015/0378498 | A1 | 12/2015 | Huie |
| 2016/0216784 | A1* | 7/2016 | Kim ...................... G06F 3/0441 |
| 2017/0068344 | A1 | 3/2017 | Bhandari et al. |
| 2018/0196574 | A1 | 7/2018 | Case, Jr. et al. |

(Continued)

FOREIGN PATENT DOCUMENTS

| CN | 107003756 A | 8/2017 |
| JP | 6082172 B1 | 2/2017 |
| JP | 2020035246 A | 3/2020 |

(Continued)

OTHER PUBLICATIONS

International Search Report and Written Opinion in International Appln. No. PCT/CN2020/100071, mailed on Apr. 6, 2021, 9 pages.

(Continued)

*Primary Examiner* — Deeprose Subedi
(74) *Attorney, Agent, or Firm* — Fish & Richardson P.C.

(57) ABSTRACT

Styluses, methods for communicating by a stylus with a device, and input systems including the device and the stylus are described. In an example, a stylus includes a first electrode for transmitting a first signal to the device, a second electrode used for transmitting a second signal to the device, and a third electrode used for receiving a third signal from the device. The first electrode is located at a tip portion of the stylus. The second electrode is located apart from the first electrode.

15 Claims, 12 Drawing Sheets

(56) References Cited

U.S. PATENT DOCUMENTS

2019/0171304 A1   6/2019  Hara et al.
2020/0042113 A1*  2/2020  Chen .................... G06F 3/0383

FOREIGN PATENT DOCUMENTS

TW      201839564 A    11/2018
TW        I687861 B     3/2020
WO     2020017477 A1    1/2020

OTHER PUBLICATIONS

Extended European Search Report in European Appln No. 20942728.5, dated Jun. 15, 2023, 7 pages.
Office Action in Japanese Appln. No. 2022-580213, mailed on Jan. 9, 2024, 6 pages (with English translation).

* cited by examiner

STYLUS COMMUNICATING WITH A DEVICE

CROSS-REFERENCE TO RELATED APPLICATIONS

This application is a continuation of International Application No. PCT/CN2020/100071, filed on Jul. 3, 2020, the disclosure of which is hereby incorporated by reference in its entirety.

TECHNICAL FIELD

The present disclosure relates to a stylus, a method for communicating by the stylus with a device, and an input system including the device and the stylus. The stylus is capable of communicating with the device. For example, the device may be a mobile phone, a smart phone, a tablet computer, a personal computer, or the like.

BACKGROUND

In recent years, various devices such as a mobile phone, a smart phone, a tablet computer, a personal computer are equipped with a touch sensor below a display thereof for detecting a touch position of a finger and/or a stylus on the display. For example, the touch sensor detects the touch position of the stylus based on a strength of a signal transmitted by an electrode located in a tip of the stylus. Also, there exists a stylus having a first electrode located in a tip of the stylus and a second electrode located in a portion apart from the tip of the stylus. In this case, the touch sensor receives a first signal from the first electrode and a second signal from the second electrode, and may detect a tilt angle of the stylus based on a distance between received positions of the first and second signals. Although such two electrodes structure enables to provide functions using both the tip position and the tilt angle of the stylus, but there is room for improvement of a writing performance.

SUMMARY

Embodiments provide a stylus, a method for communicating by the stylus with a device, and an input system including the device and the stylus. The device may be a mobile phone, a smart phone, a tablet computer, a personal computer, or the like.

A first aspect of the embodiments provides a stylus capable of communicating with a device. In a first possible implementation form of the first aspect, the stylus comprises: a first electrode used for transmitting a first signal to the device, where the first electrode is located at a tip portion of the stylus; a second electrode used for transmitting a second signal to the device, where the second electrode is located apart from the first electrode; and a third electrode used for receiving a third signal from the device. In some examples, the third signal is used for triggering transmission of the first and second signals.

According to the first possible implementation form of the first aspect, the device may receive the first signal from the first electrode and the second signal from the second electrode, thereby detecting a tilt angle of the stylus based on received positions of the first and second signals. Further, the device may transmit the third signal triggering transmission of the first and second signals, so that the device may accurately recognize transmission periods of the first and second signals following the third signal. This may make it possible to certainly receive the first and second signals at the device even though an interval between adjacent transmission periods of the first and second signals is around 5 µs or less. Accordingly, three electrodes structure of the stylus mentioned above may provide high temporal resolution on detection of the tip position and the tilt angle of stylus, thereby improving a writing performance.

A second possible implementation form of the first aspect provides: the stylus according to the first possible implementation form of the first aspect, where the third signal carries information including at least one of frequency information and an identifier of a specific stylus corresponding to the device.

For example, the frequency information may include information indicating frequencies for transmission of the first and second signals respectively. Using the frequency information, the device may change at least one of the frequencies corresponding to the first and second signals, thereby avoiding that a frequency of noise is close to the frequencies for the transmission of the first and second signals. The identifier may be used for limiting a usable stylus for the device and/or to distinguish between two or more styluses used simultaneously.

A third possible implementation form of the first aspect provides: the stylus according to the first or second possible implementation form of the first aspect, where the third electrode is located between the first electrode and the second electrode. According to the third possible implementation form of the first aspect, the third electrode may reduce interference between the first and second signals during transmission of the first and second signals, thereby improving a signal to noise ratio (SNR) during downlink transmission from the stylus to the device.

A fourth possible implementation form of the first aspect provides: the stylus according to any one of the first to third possible implementation forms of the first aspect, where the second electrode has a ring shape, and the stylus further comprises a ground shield configured to be inside the second electrode. According to the fourth possible implementation form of the first aspect, the ground shield may reduce interference between the first and second signals during the transmission of the first and second signals, so that reduction of the interference between the first and second signals improves the downlink SNR and makes it possible to lower transmission voltages applied to the first and second electrodes that are required for an adequate performance.

A fifth possible implementation form of the first aspect provides: the stylus according to any one of the first to fourth possible implementation forms of the first aspect, where during reception of the third signal from the device, the first electrode acts as a floating electrode. According to the fifth possible implementation form of the first aspect, the first electrode acting as the floating electrode enhances the third signal from the device, thereby improving a SNR during uplink transmission from the device to the stylus.

A sixth possible implementation form of the first aspect provides: the stylus according to any one of the first to fifth possible implementation forms of the first aspect, where during reception of the third signal from the device, the first electrode acts as an electrode for receiving the third signal from the device. According to the sixth possible implementation form of the first aspect, the third signal is received by the first electrode located in a closer position than the third electrode as well as the third electrode and enhanced, thereby improving the uplink SNR.

A seventh possible implementation form of the first aspect provides: the stylus according to the sixth possible implementation form of the first aspect, further comprising: a transmitter configured to transmit the first signal; a receiver configured to receive the third signal; and a switch set configured to connect the first electrode with the transmitter during transmission of the first signal to the device, and to connect the first electrode with the receiver during reception of the third signal from the device.

According to the seventh possible implementation form of the first aspect, the transmitter may transmit the first and second signals via the first and second electrodes respectively during the downlink transmission, and the receiver may receive the third signal via the first and third electrodes during the uplink transmission, thereby improving the uplink SNR.

A eighth possible implementation form of the first aspect provides: the stylus according to any one of the first to seventh possible implementation forms of the first aspect, where the first signal is used for detection of a position at which the tip portion of the stylus touches a touch panel of the device, and the second signal is used for detection of a tilt angle of the stylus. According to the eighth possible implementation form of the first aspect, various functions using both the tip position and the tilt angle of the stylus may be implemented on the device.

A ninth possible implementation form of the first aspect provides: the stylus according to any one of the first to eighth possible implementation forms of the first aspect, where a first period for transmission of the first and second signals is separated from a second period for reception of the third signal. According to the ninth possible implementation form of the first aspect, the first period for the downlink transmission is separated from the second period for the uplink transmission, thereby avoiding interference between uplink and downlink signals.

A tenth possible implementation form of the first aspect provides: the stylus according to any one of the first to ninth possible implementation forms of the first aspect, where a first frequency at which the first signal is transmitted is different from a second frequency at which the second signal is transmitted. According to the tenth possible implementation form of the first aspect, the first and second signals are transmitted at different frequencies from each other, thereby reducing interference between the first and second signals and improving the downlink SNR.

A second aspect of the embodiments provides a method for communicating by a stylus with a device. In a first possible implementation form of the second aspect, the method comprises: receiving, by a third electrode of the stylus, a third signal from the device during uplink transmission periods; transmitting, by a first electrode of the stylus, a first signal to the device during downlink transmission periods, wherein the first electrode is located at a tip portion of the stylus; transmitting, by a second electrode of the stylus, a second signal to the device during the downlink transmission periods, wherein the second electrode is located apart from the first electrode. In some examples, the third signal is used for triggering transmission of the first and second signals.

According to the first possible implementation form of the second aspect, the device may receive the first signal from the first electrode and the second signal from the second electrode, thereby detecting a tilt angle of the stylus based on received positions of the first and second signals. Further, the device may transmit the third signal triggering transmission of the first and second signals, so that the device may accurately recognize transmission periods of the first and second signals following the third signal. This may make it possible to certainly receive the first and second signals at the device even though an interval between adjacent transmission periods of the first and second signals is around 5 µs or less. Accordingly, three electrodes structure of the stylus mentioned above may provide high temporal resolution on detection of the tip position and the tilt angle of stylus, thereby improving a writing performance.

A second possible implementation form of the second aspect provides: the stylus according to the first possible implementation form of the second aspect, where the third signal carries information including at least one of frequency information and an identifier of a specific stylus corresponding to the device.

For example, the frequency information may include information indicating frequencies for transmission of the first and second signals respectively. Using the frequency information, the device may change at least one of the frequencies corresponding to the first and second signals, thereby avoiding that a frequency of noise is close to the frequencies for the transmission of the first and second signals. The identifier may be used for limiting a usable stylus for the device and/or to distinguish between two or more styluses used simultaneously.

A third possible implementation form of the second aspect provides: the method according to the first or second possible implementation form of the second aspect, where the receiving is specifically performed by the third electrode located between the first electrode and the second electrode. According to the third possible implementation form of the second aspect, the third electrode may reduce interference between the first and second signals during transmission of the first and second signals, thereby improving the downlink SNR.

A fourth possible implementation form of the second aspect provides: the method according to any one of the first to third possible implementation form of the second aspect, further comprising: managing the first electrode to act as a floating electrode during the uplink transmission periods. According to the fourth possible implementation form of the second aspect, the third signal is received by the first electrode located in a closer position than the third electrode as well as the third electrode and enhanced, thereby improving the uplink SNR.

A fifth possible implementation form of the second aspect provides: the method according to any one of the first to fourth possible implementation forms of the second aspect, further comprising: managing the first electrode to act as an electrode for receiving the third signal from the device during the uplink transmission periods. According to the fifth possible implementation form of the second aspect, the third signal is received by the first electrode located in a closer position than the third electrode as well as the third electrode and enhanced, thereby improving the uplink SNR.

A sixth possible implementation form of the second aspect provides: the method according to the fifth possible implementation form of the second aspect, further comprising: controlling a switch set of the stylus to connect the first electrode with a transmitter of the stylus during the downlink transmission periods, and to connect the first electrode with a receiver of the stylus during the uplink transmission periods. According to the sixth possible implementation form of the second aspect, the transmitter may transmit the first and second signals via the first and second electrodes respectively during the downlink transmission, and the receiver may receive the third signal via the first and third electrodes during the uplink transmission, thereby improving the uplink SNR.

A seventh possible implementation form of the second aspect provides: the method according to any one of the first to sixth possible implementation forms of the second aspect, where the first signal is used for detection of a position at which the tip portion of the stylus touches a touch panel of the device, and the second signal is used for detection of a tilt angle of the stylus. According to the seventh possible implementation form of the second aspect, various functions using both the tip position and the tilt angle of the stylus may be implemented on the device.

A eighth possible implementation form of the second aspect provides: the method according to any one of the first to seventh possible implementation forms of the second aspect, where a first frequency at which the first signal is transmitted is different from a second frequency at which the second signal is transmitted. According to the eighth possible implementation form of the second aspect, the first and second signals are transmitted at different frequencies from each other, thereby reducing interference between the first and second signals and improving the downlink SNR.

A third aspect of the embodiments provides an input system including a device and a stylus capable of communicating with the device. In a first possible implementation form of the third aspect, the stylus comprises: a first electrode used for transmitting a first signal to the device, wherein the first electrode is located at a tip portion of the stylus; a second electrode used for transmitting a second signal to the device, wherein the second electrode is located apart from the first electrode; and a third electrode used for receiving a third signal from the device. In some examples, the third signal is used for triggering transmission of the first and second signals.

According to the first possible implementation form of the third aspect, the device may receive the first signal from the first electrode and the second signal from the second electrode, thereby detecting a tilt angle of the stylus based on received positions of the first and second signals. Further, the device may transmit the third signal triggering transmission of the first and second signals, so that the device may accurately recognize transmission periods of the first and second signals following the third signal. This may make it possible to certainly receive the first and second signals at the device even though an interval between adjacent transmission periods of the first and second signals is around 5 μs or less. Accordingly, three electrodes structure of the stylus mentioned above may provide high temporal resolution on detection of the tip position and the tilt angle of stylus, thereby improving a writing performance.

A second possible implementation form of the third aspect provides: the stylus according to the first possible implementation form of the third aspect, where the third signal carries information including at least one of frequency information and an identifier of a specific stylus corresponding to the device.

For example, the frequency information may include information indicating frequencies for transmission of the first and second signals respectively. Using the frequency information, the device may change at least one of the frequencies corresponding to the first and second signals, thereby avoiding that a frequency of noise is close to the frequencies for the transmission of the first and second signals. The identifier may be used for limiting a usable stylus for the device and/or to distinguish between two or more styluses used simultaneously.

A third possible implementation form of the third aspect provides: the system according to the first or second possible implementation form of the third aspect, where the third electrode is located between the first electrode and the second electrode. According to the third possible implementation form of the third aspect, the third electrode may reduce interference between the first and second signals during transmission of the first and second signals, thereby improving the downlink SNR.

A fourth possible implementation form of the third aspect provides: the system according to any one of the first to third possible implementation forms of the third aspect, where the second electrode has a ring shape, and the stylus further comprises a ground shield configured to be inside the second electrode. According to the fourth possible implementation form of the third aspect, the ground shield may reduce interference between the first and second signals during the transmission of the first and second signals, so that reduction of the interference between the first and second signals improves the downlink SNR and makes it possible to lower transmission voltages applied to the first and second electrodes that are required for an adequate performance.

A fifth possible implementation form of the third aspect provides: the system according to any one of the first to fourth possible implementation forms of the third aspect, where during reception of the third signal from the device, the first electrode acts as a floating electrode. According to the fifth possible implementation form of the third aspect, the first electrode acting as the floating electrode enhances the third signal from the device, thereby improving a SNR during uplink transmission from the device to the stylus.

A sixth possible implementation form of the third aspect provides: the system according to any one of the first to fifth possible implementation form of the third aspect, where during reception of the third signal from the device, the first electrode acts as an electrode for receiving the third signal from the device. According to the sixth possible implementation form of the third aspect, the third signal is received by the first electrode located in a closer position than the third electrode as well as the third electrode and enhanced, thereby improving the uplink SNR.

A seventh possible implementation form of the third aspect provides: the system according to the sixth possible implementation form of the third aspect, where the stylus further comprises: a transmitter configured to transmit the first signal; a receiver configured to receive the third signal; and a switch set configured to connect the first electrode with the transmitter during transmission of the first signal to the device, and to connect the first electrode with the receiver during reception of the third signal from the device.

According to the seventh possible implementation form of the third aspect, the transmitter may transmit the first and second signals via the first and second electrodes respectively during the downlink transmission, and the receiver may receive the third signal via the first and third electrodes during the uplink transmission, thereby improving the uplink SNR.

A eighth possible implementation form of the third aspect provides: the system according to any one of the first to seventh possible implementation forms of the third aspect, where the first signal is used for detection of a position at which the tip portion of the stylus touches a touch panel of the device, and the second signal is used for detection of a tilt angle of the stylus. According to the eighth possible implementation form of the third aspect, various functions using both the tip position and the tilt angle of the stylus may be implemented on the device.

A ninth possible implementation form of the third aspect provides: the system according to any one of the first to eighth possible implementation forms of the third aspect, where a first period for transmission of the first and second signals is separated from a second period for reception of the third signal. According to the ninth possible implementation form of the third aspect, the first period for the downlink transmission is separated from the second period for the uplink transmission, thereby avoiding interference between uplink and downlink signals.

A tenth possible implementation form of the third aspect provides: the system according to any one of the first to ninth possible implementation forms of the third aspect, where a first frequency at which the first signal is transmitted is different from a second frequency at which the second signal is transmitted. According to the tenth possible implementation form of the third aspect, the first and second signals are transmitted at different frequencies from each other, thereby reducing interference between the first and second signals and improving the downlink SNR.

A fourth aspect of the embodiments provides a non-transitory computer readable storage medium storing a program to cause a computer to implement the method of the second aspect. A fifth aspect of the embodiments provides a computer program to cause a computer to implement the method of the second aspect.

DESCRIPTION OF EMBODIMENTS

The following describes technical solutions of embodiments, referring to the accompanying drawings. It will be understood that the embodiments described below are not all but just some of embodiments relating to the present disclosure. It is to be noted that all other embodiments which may be derived by a person skilled in the art based on the embodiments described below without creative efforts shall fall within the protection scope of the present disclosure.

Following describes an input system including a device and a stylus according to one embodiment of the present disclosure. For example, the device may be a mobile phone, a smart phone, a tablet computer, a personal computer, or the like. The stylus is an input apparatus used for operating the device.

Figure 1:
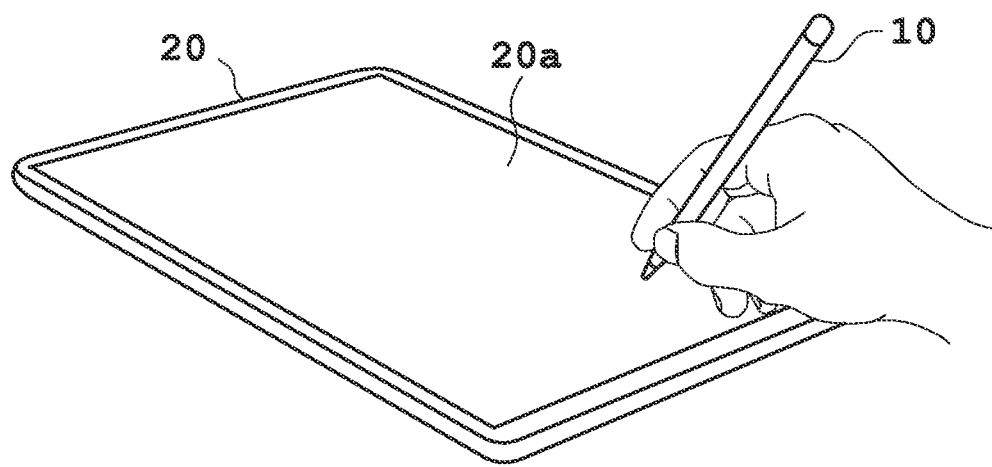
FIG. 1 shows an example of an input system including a device and a stylus according to an embodiment of the present disclosure.

FIG. 1 shows an example of an input system including a device and a stylus according to the embodiment of the present disclosure. An input system 5 shown in FIG. 1 is an example of the input system according to the embodiment of the present disclosure.

In an example of FIG. 1, the input system 5 comprises a stylus 10 and a device 20. The stylus 10 is an example of a pen-type input apparatus. Also, the stylus 10 is capable of communicating with the device 20. The device 20 may be a mobile phone, a smart phone, a tablet computer, a personal computer, or the like. The device 20 comprises a touch panel 20a capable of detecting a tip position and a tilt angle of the stylus 10 through communication with the stylus 10.

The device 20 includes processing circuitry. The processing circuitry may be an integrated circuit (IC) so called Touch IC implemented in a touch panel, or a processor such as a central processing unit (CPU), a field-programmable gate array (FPGA) or an application specific integrated circuit (ASIC). The processor is connected to a memory such as a read-only memory (ROM) or a random access memory (RAM), a flash memory, or the like. The memory may store a program to cause the processor to control operation of the device 20. Likewise, the stylus 10 may also comprise processing circuitry such as the processor or an IC chip and the memory which may store a program to cause the processor to control operation of the stylus 10. In some examples, the program may be provided via a non-transitory computer readable storage medium to the stylus 10 and/or the device 20.

Figure 2:
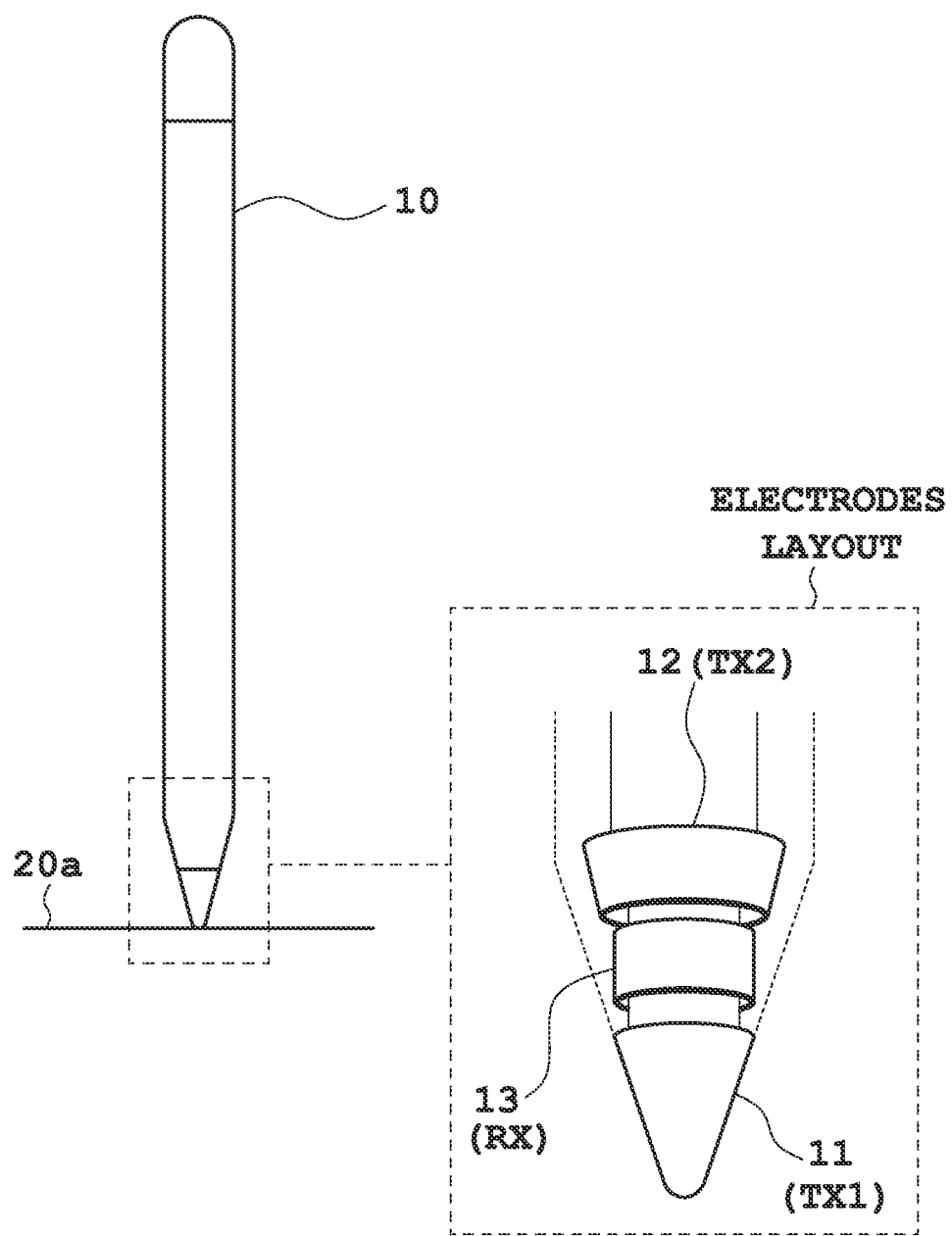
FIG. 2 is a schematic diagram for describing electrodes of the stylus according to the embodiment of the present disclosure.

Following describes an electrodes structure of the stylus 10 with reference to FIG. 2. FIG. 2 is a schematic diagram for describing electrodes of the stylus according to the embodiment of the present disclosure.

In an example of FIG. 2, the stylus 10 comprises a first electrode 11 (TX1) used for transmitting a first signal to the device 20. The first electrode 11 is located at a tip portion of the stylus 10. Also, the stylus 10 comprises a second electrode 12 (TX2) used for transmitting a second signal to the device 20. The second electrode 12 is located apart from the first electrode 11. Also, the second electrode 12 may have a ring shape placed around a core of the stylus 10. The stylus 10 further comprises a third electrode 13 (RX) used for receiving a third signal from the device 20.

Figure 3:
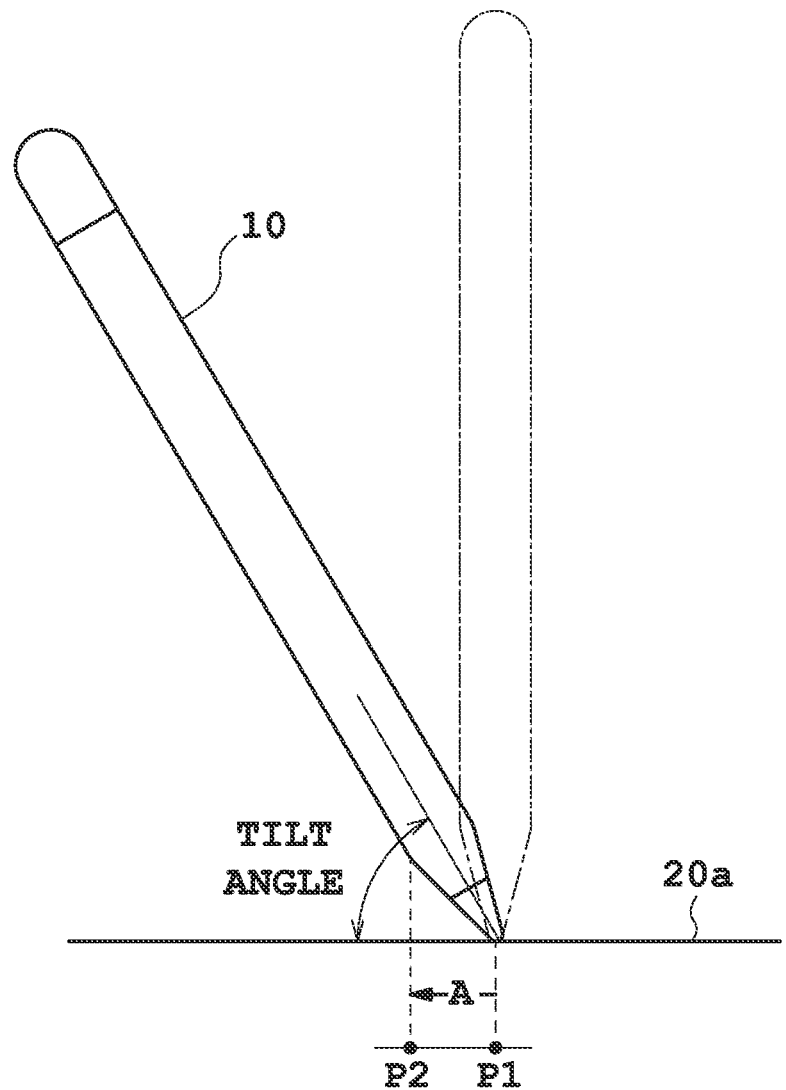
FIG. 3 is a schematic diagram for describing a method for detecting a tilt angle of the stylus according to the embodiment of the present disclosure.

The device 20 may receive the first signal from the first electrode 11 and the second signal from the second electrode 12, and the device 20 may detect the tilt angle of the stylus 10 based on a distance A received positions P1 and P2 on the touch panel 20a of the first and second signals, as shown in FIG. 3. FIG. 3 is a schematic diagram for describing a method for detecting a tilt angle of the stylus according to the embodiment of the present disclosure.

In addition, the device 20 may transmit the third signal triggering transmission of the first and second signals. Using the third signal enables the device 20 to accurately recognize transmission periods of the first and second signals following the third signal, so that the device 20 may certainly receive the first and second signals even though an interval between adjacent transmission periods of the first and second signals is around 5 μs or less. Accordingly, three electrodes structure of the stylus 10 mentioned above may provide high temporal resolution on detection of the tip position and the tilt angle of stylus 10, thereby improving a writing performance.

In addition, the device 20 may transmit the third signal carrying information including at least one of frequency information and an identifier of a specific stylus usable for the device 20.

For example, the frequency information may include information indicating frequencies for transmission of the first and second signals respectively. Using the frequency information, the device 20 may change at least one of the frequencies corresponding to the first and second signals, thereby avoiding that a frequency of noise is close to the frequencies for the transmission of the first and second signals. This may provide improvement of a signal to noise ratio (SNR) during downlink transmission from the stylus 10 to the device 20.

The identifier may be used for limiting a usable stylus for the device 20. For example, the stylus 10 may transmit the first and second signals if the stylus 10 determines that an identifier of the stylus 10 is identical to the identifier carried by the third signal from the device 20. This function may be usable for preventing fraud use of the device 20. In addition, the identifier may be used to distinguish between two or more styluses used simultaneously. This may extend functionality of the device 20.

Referring back to FIG. 2, the third electrode 13 may be located between the first electrode 11 and the second electrode 12. According to this electrodes layout, the third electrode 13 may reduce interference between the first and second signals during transmission of the first and second signals, thereby improving the downlink SNR.

The first electrode 11 may be made from a non-conductive material or a conductive material such as a metal or a conductive polymer. However, the downlink SNR may be improved when applying the conductive material to the first electrode 11. Further, the downlink SNR may be improved when the first electrode 11 is configured to act as a floating electrode. The second electrode 12 may be configured to be grounded or floated. However, the downlink SNR may be improved when the second electrode 12 is configured to be grounded. Following table shows comparison of the downlink SNR between four conditions on the first electrode 11 and the second electrode 12.

TABLE

Comparison of the downlink SNR

|  | Condition 1 | Condition 2 | Condition 3 | Condition 4 |
| --- | --- | --- | --- | --- |
| TX1 Driving | Grounded | Floated | Floated | Floated |
| TX1 Material | Non-conductive | Non-conductive | Conductive | Conductive |
| TX2 Driving | Grounded | Grounded | Floated | Grounded |
| DL SNR [db] | 32 | 35 | 48 | 52 |

Figure 4:
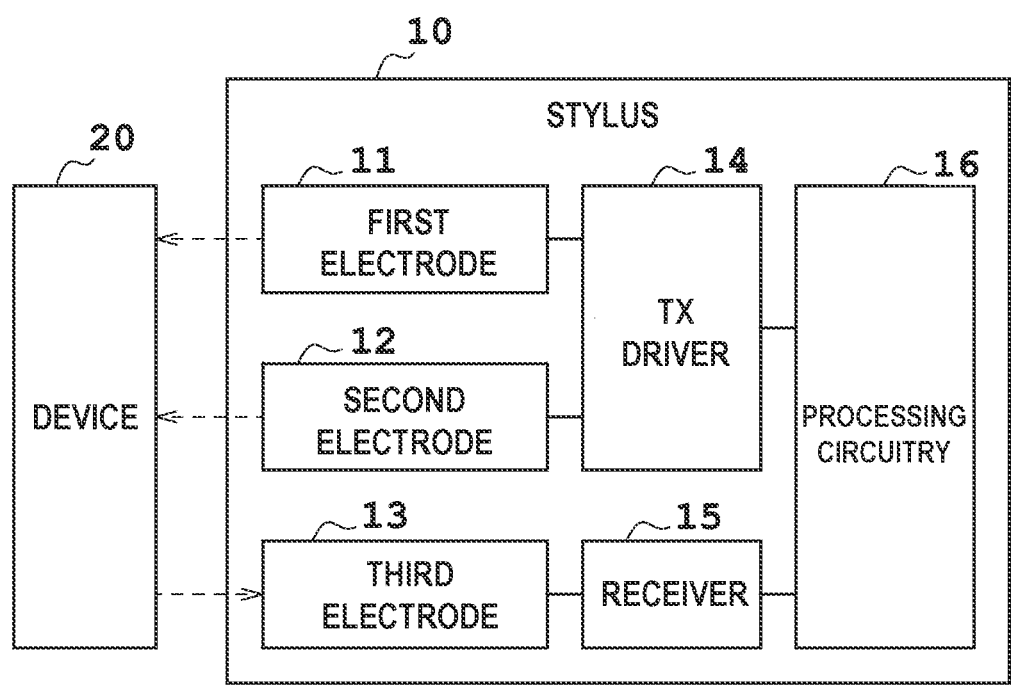
FIG. 4 is a schematic block diagram for describing elements of the stylus according to the embodiment of the present disclosure.

Following describes functions of the stylus 10 with reference to FIG. 4. FIG. 4 is a schematic block diagram for describing elements of the stylus according to the embodiment of the present disclosure. In an example of FIG. 4, the stylus 10 comprises the first electrode 11, the second electrode 12, the third electrode 13, a TX driver 14, a receiver 15 and a processor 16. The TX driver 14 is an example of a transmitter configured to apply voltage pulses to the first electrode 11 and the second electrode 12, to transmit the first and second signals to the device 20. The receiver 15 is configured to receive the third signal from the device 20 via the third electrode 13. The processor 16 is configured to control the TX driver 14 to transmit the first and second signals during downlink transmission periods and to control the receiver 15 to receive the third signal during uplink transmission periods.

Figure 5:
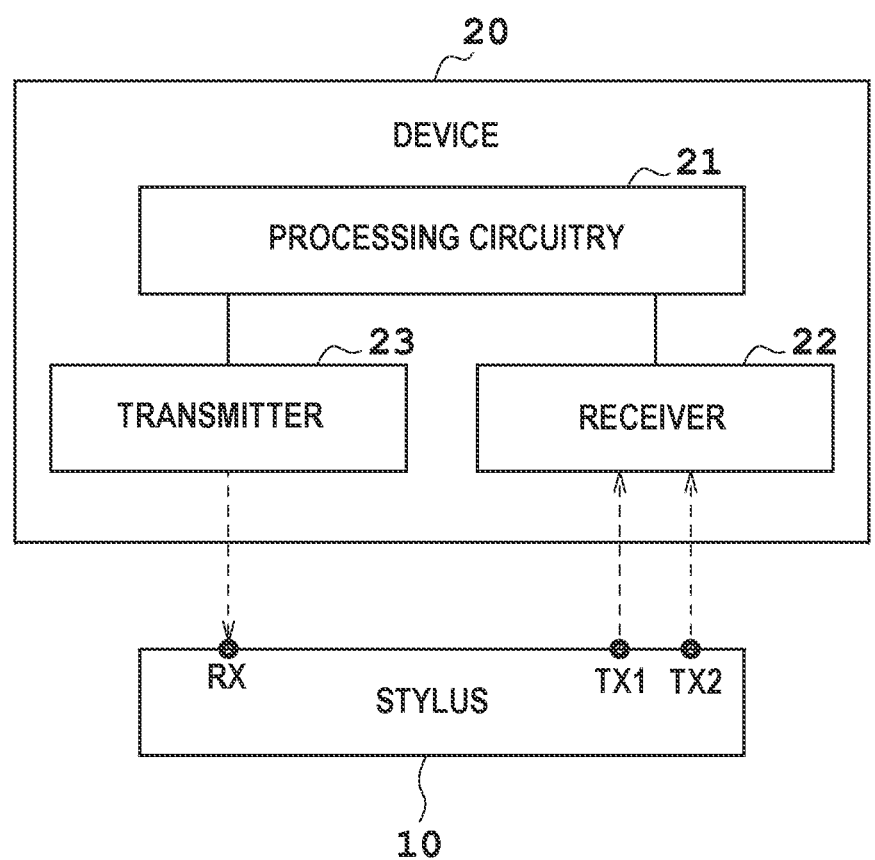
FIG. 5 is a schematic block diagram for describing elements of the device according to the embodiment of the present disclosure.

Following describes functions of the device 20 with reference to FIG. 5. FIG. 5 is a schematic block diagram for describing elements of the device according to the embodiment of the present disclosure. In an example of FIG. 5, the device 20 comprises a receiver 21, a transmitter 22, and a processor 23. The receiver 21 and the transmitter 22 may be implemented in the touch panel 20a. The receiver 21 is connected with a receiving electrode (not shown in the figure) and is configured to receive the first and second signals from the stylus 10 via the receiving electrode. The transmitter 22 is connected with a transmitting electrode (not shown in the figure) and is configured to transmit the third signal to the stylus 10 via the transmitting electrode.

The processor 23 is configured to control the receiver 21 to receive the first and second signals during the downlink transmission periods, and to control the transmitter 22 to transmit the third signal during the uplink transmission periods. Also, the processor 23 is configured to determine received positions (e.g. P1 and P2 of FIG. 3) on the touch panel 20a of the first and second signals, to calculate a distance between the determined positions, and to detect the tilt angle of the stylus 10 based on the distance.

Figure 6:
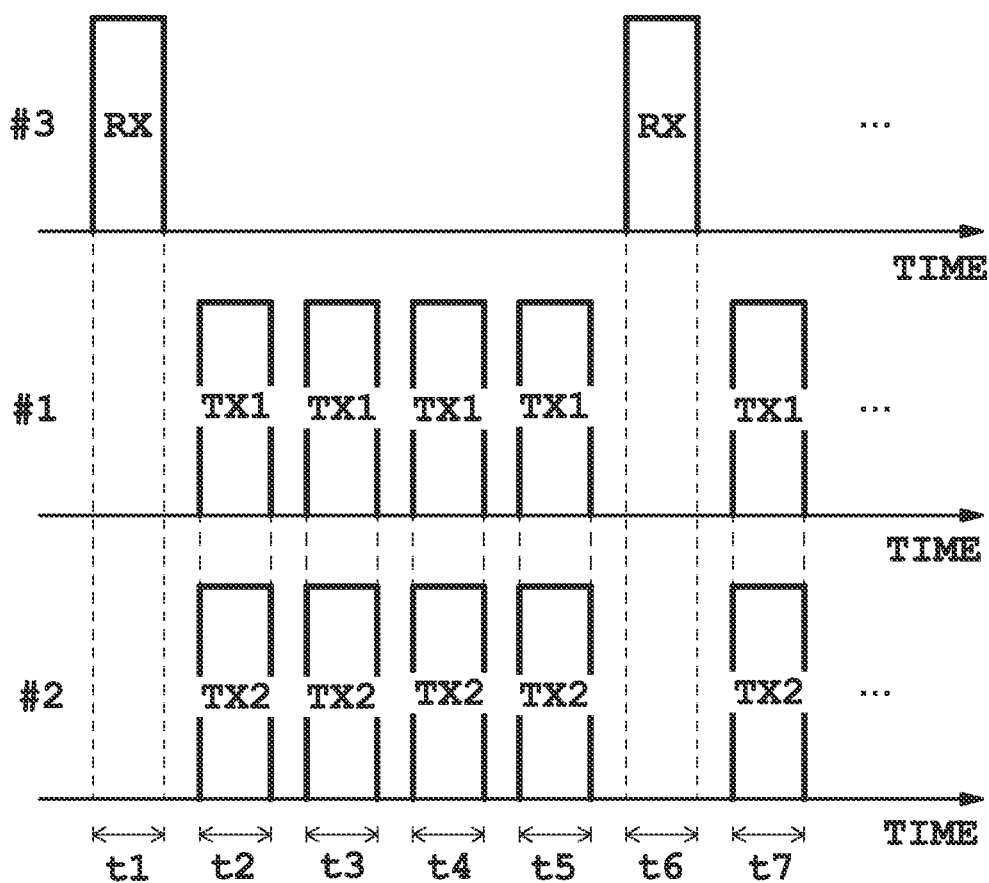
FIG. 6 is a schematic diagram for describing configuration of uplink and downlink transmission periods according to the embodiment of the present disclosure.

Following describes configuration of uplink and downlink transmission periods with reference to FIG. 6. FIG. 6 is a schematic diagram for describing configuration of uplink and downlink transmission periods according to the embodiment of the present disclosure.

In an example of FIG. 6, each RX block indicates a period for reception of the third signal by the third electrode 13 of the stylus 10, and corresponds to the uplink transmission period (e.g. t1 and t7 of FIG. 6). In each uplink transmission period, a predetermined number of signal pulses may be transmitted to the stylus 10.

Each TX1 block indicates a period for transmission of the first signal by the first electrode 11 of the stylus 10, and each TX2 block indicates a period for transmission of the second signal by the second electrode 12 of the stylus 10. The TX1 and TX2 blocks correspond to the downlink transmission period (e.g. t2 to t5 and t7 of FIG. 6). In each downlink transmission period, a predetermined number of signal pulses may be transmitted to the device 20.

The transmitter 22 of the device 20 transmits the third signal to the stylus 10 during the uplink transmission period, and the receiver 21 of the device 20 receives the first and second signals from the stylus 10 during the downlink transmission period. As shown in FIG. 6, the downlink transmission period is separated from the uplink transmission period, thereby avoiding interference between the third signal (an uplink signal) and each of the first and second signals (downlink signals).

Arrangement of the uplink and downlink transmission periods may be predetermined, and a sequence of the downlink transmission periods begins after the downlink transmission period as shown in FIG. 6. Also, there exists a predetermined number of the downlink transmission periods between the adjacent two uplink transmission periods. Therefore, when the device 20 determines an initial downlink transmission period and informs it to the stylus 10, the stylus 10 transmits the first and second signals during uplink transmission periods following the initial downlink transmission period. Accordingly, the device 20 can accurately recognize reception timing of the first and second signals following transmission of the third signal, thereby certainly receiving and processing the first and second signals even though an interval between adjacent transmission periods is around 5 µs or less. This makes it possible to implement high temporal resolution on detection of the tip position and the tilt angle of stylus, thereby improving a writing performance.

Figure 7:
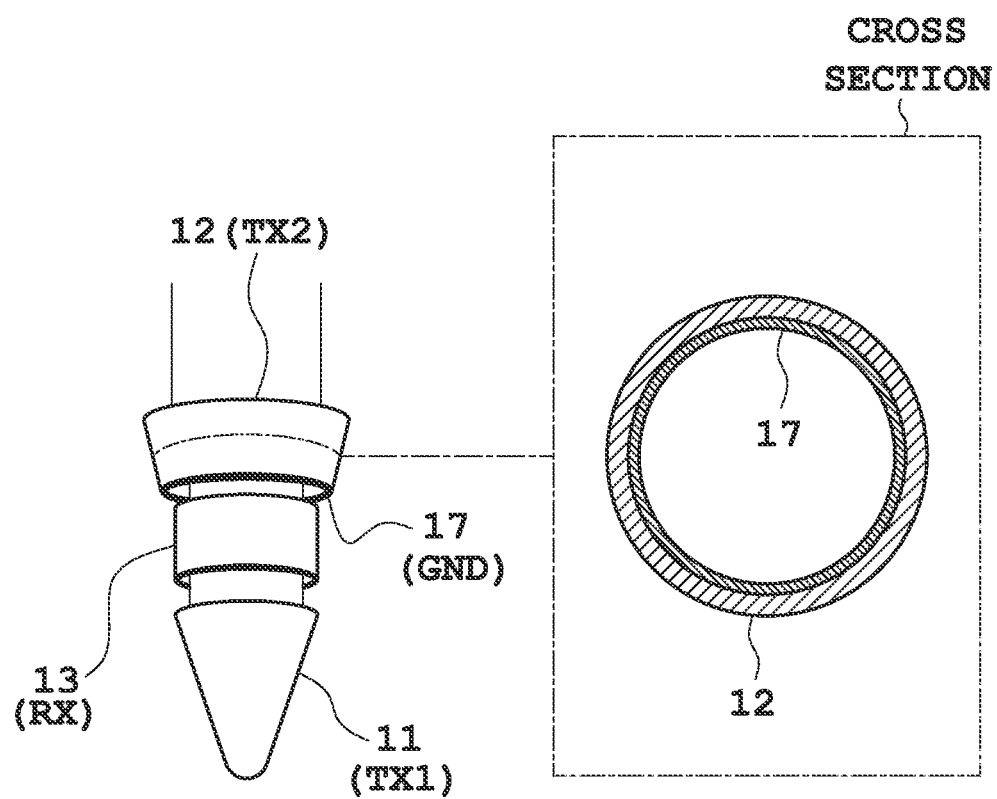
FIG. 7 is a schematic diagram for describing addition of a ground shield to the stylus according to the embodiment of the present disclosure.

Following describes one variation of the electrodes structure of the stylus 10 with reference to FIG. 7. FIG. 7 is a schematic diagram for describing addition of a ground shield to the stylus according to the embodiment of the present disclosure.

As shown in FIG. 7, the stylus 10 further comprises a ground shield 17. In an example of FIG. 7, the ground shield 17 has a ring shape like the second electrode 12, and at least a part of the ground shield 17 is placed inside the second electrode 12. This configuration of the ground shield 17 is merely one example, various shapes and arrangements may be applied to the ground shield 17 as variations of the embodiment. Addition of the ground shield 17 may reduce interference between the first and second signals, thereby improving the downlink SNR. Also, improvement of the downlink SNR makes it possible to lower transmission voltages applied to both the first electrode 11 and the second electrode 12 that are required for an adequate performance.

Figure 8A:
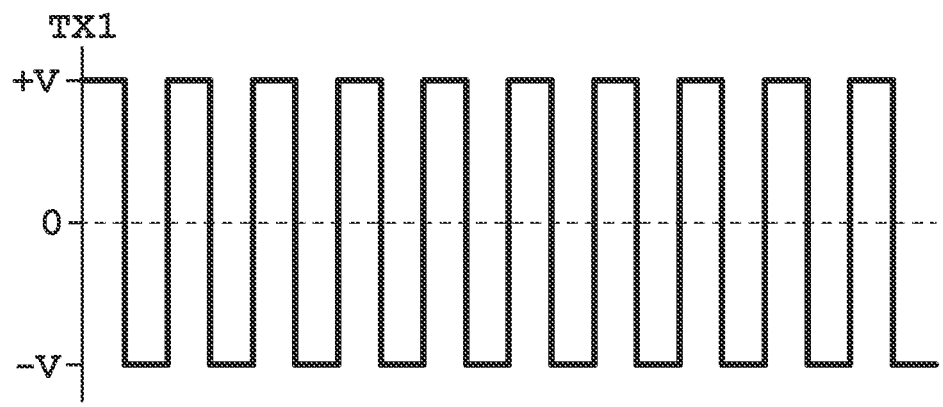
FIG. 8A shows an example of a TX1 signal from a TX1 electrode.
Figure 8B:
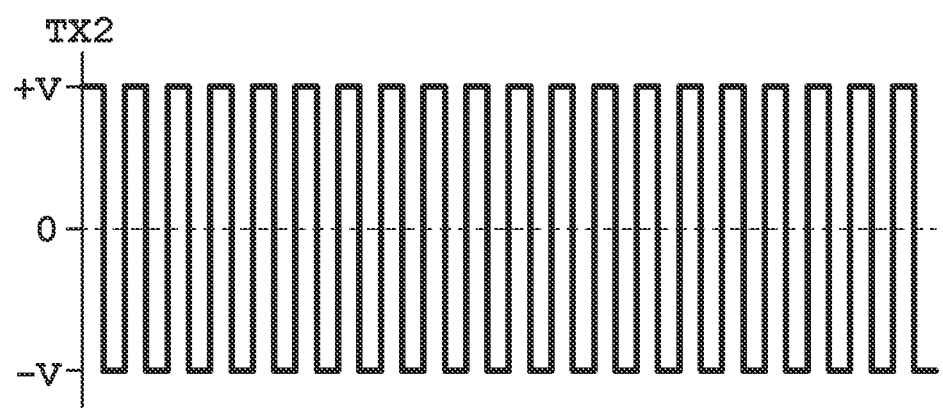
FIG. 8B shows an example of a TX2 signal from a TX2 electrode.

Following describes waveforms of the first and second signals with reference to FIGS. 8A and 8B. FIG. 8A shows an example of a TX1 signal from a TX1 electrode, and FIG. 8B shows an example of a TX2 signal from a TX2 electrode. As shown in FIG. 8A, each of the first signal (TX1) and the second signal (TX2) has a waveform in which pulses are arranged at equal intervals. In examples of FIGS. 8A and 8B, the interval of the first signal is set to be larger than that of the second signal, that is, a frequency of the first signal is set to be smaller than that of the second signal. This frequency setting may reduce interference between the first and second signal, thereby improving the downlink SNR.

Figure 9A:
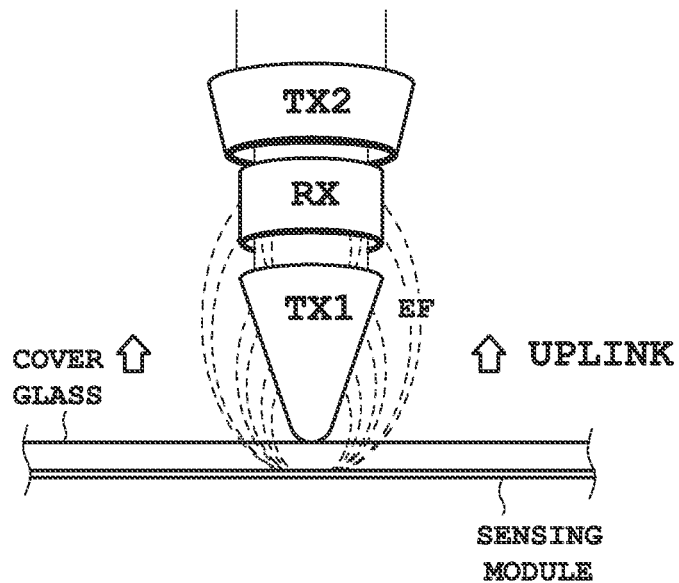
FIG. 9A is a schematic diagram for describing a method to enhance an uplink signal according to the embodiment of the present disclosure.

Following describes a first method to enhance an uplink signal with reference to FIG. 9A. FIG. 9A is a schematic diagram for describing a method to enhance an uplink signal according to the embodiment of the present disclosure.

As shown in FIG. 9A, a sensing module in the touch panel 20a of the device 20 generates an electric field for transmission of an uplink signal (the third signal). If the first electrode 11 (TX1) is configured to be grounded, a portion of the electric field is cut by the first electrode 11 and a strength of the third signal received by the third electrode 13 is reduced. Therefore, in the first method according to the embodiment of the present disclosure, the TX driver 14 of the stylus 10 controls the first electrode 11 to act as a floating electrode during the uplink transmission period. According to the first method, the first electrode 11 acting as the floating electrode enhances the third signal as shown in FIG. 9A, thereby improving the uplink SNR.

Figure 9B:
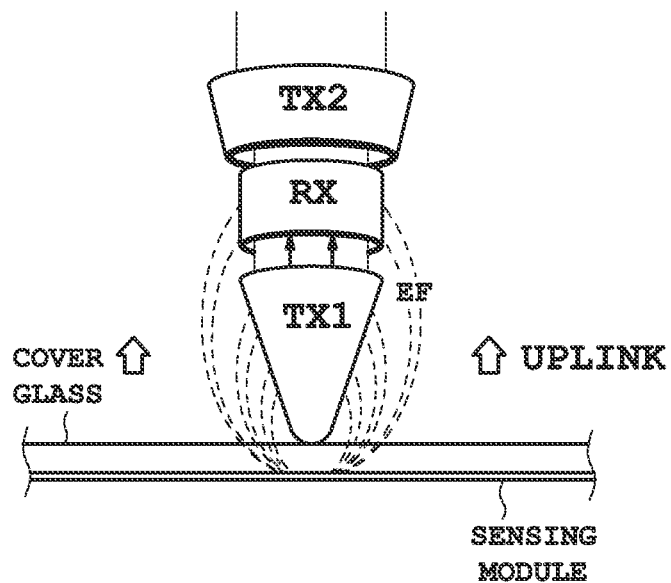
FIG. 9B is a schematic diagram for describing another method to enhance an uplink signal according to another embodiment of the present disclosure.

Following describes a second method to enhance an uplink signal with reference to FIG. 9B. FIG. 9B is a schematic diagram for describing another method to enhance an uplink signal according to another embodiment of the present disclosure.

In the second method according to the embodiment of the present disclosure, the TX driver 14 of the stylus 10 controls the first electrode 11 to act as an electrode for receiving the third signal from the device 20 during the uplink transmission period. In this case, the third signal received via the first electrode 11 is transferred to the receiver 15. Accordingly, the receiver 15 may receive the third signal via both the first electrode 11 and the third electrode 13. In the second method, the third signal is received by the first electrode 11 located in a closer position than the third electrode 13 as well as the third electrode 13 and enhanced, thereby improving the uplink SNR.

Figure 10A:
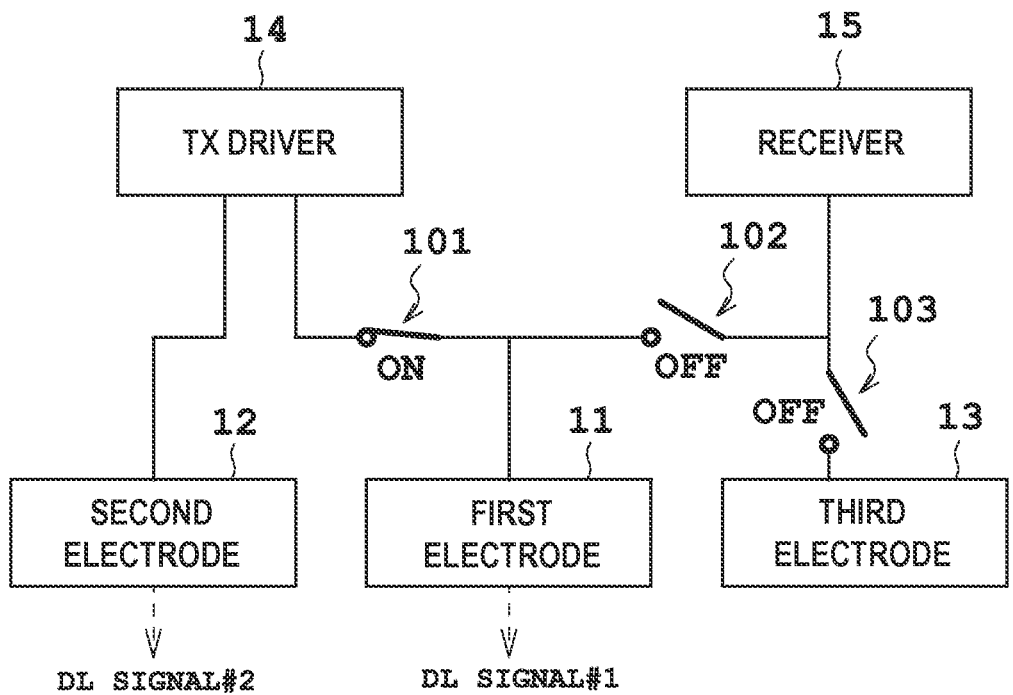
FIGS. 10A and 10B show switching mechanism for changing a path to the TX1 electrode according to said another embodiment of the present disclosure.
Figure 10B:
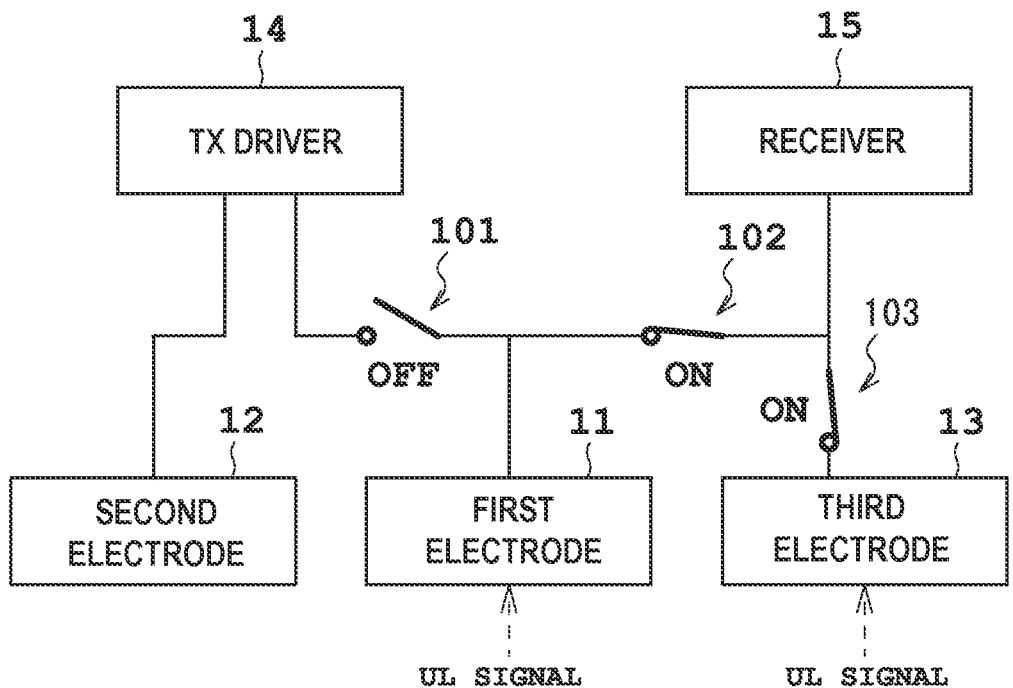

It should be noted that configuration of the stylus 10 shown in FIG. 4 should be changed to add a path connecting the first electrode 11 with the receiver 15 in order to implement the second method. Following describes switching mechanism for changing a path to the first electrode 11 with reference to FIGS. 10A and 10B. FIGS. 10A and 10B show switching mechanism for changing a path to the TX1 electrode according to said another embodiment of the present disclosure.

As shown in FIG. 10A, the stylus 10 further comprises a switch set including switches 101, 102 and 103. During the downlink transmission periods, the switch 101, 102 and 103 are set to be ON, OFF and OFF, respectively, and the first electrode 11 is connected with the TX driver 14. In this case, the first electrode 11 is used for transmission of the first signal (DL Signal #1).

On the other hand, during the uplink transmission periods, the switch 101, 102 and 103 are set to be OFF, ON and ON, respectively, and the first electrode 11 is connected with the receiver 15 as shown in FIG. 10B. In this case, the first electrode 11 is used for reception of the third signal (UL Signal), and the third signal received via the first electrode 11 closer to the touch panel 20a than the third electrode 13 strongly enhances the third signal received via the third electrode 13 and the enhanced third signal is transferred to the receiver 15. Accordingly, the second method described above may further improve the uplink SNR.

Figure 11:
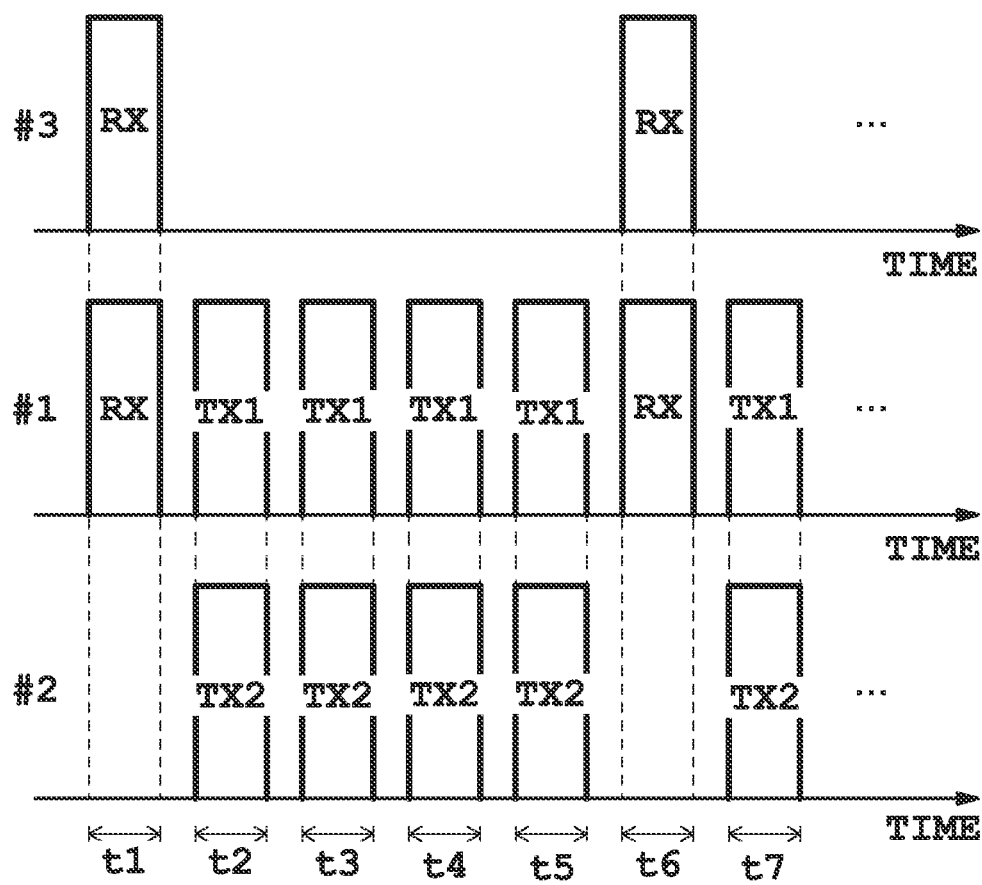
FIG. 11 is a schematic diagram for describing configuration of uplink and downlink transmission periods according to said another embodiment of the present disclosure.

In the second method described above, configuration of the uplink and downlink transmission periods are changed to that shown in FIG. 11. FIG. 11 is a schematic diagram for describing configuration of uplink and downlink transmission periods according to said another embodiment of the present disclosure. In an example of FIG. 11, RX blocks at periods t1 and t6 are added to a sequence of blocks including TX1 blocks that indicate transmission periods of the first signal. In this case, the stylus 10 receives the third signal from the device 20 by using both the first electrode 11 and the third electrode 13 at the periods t1 and t6.

Figure 12:
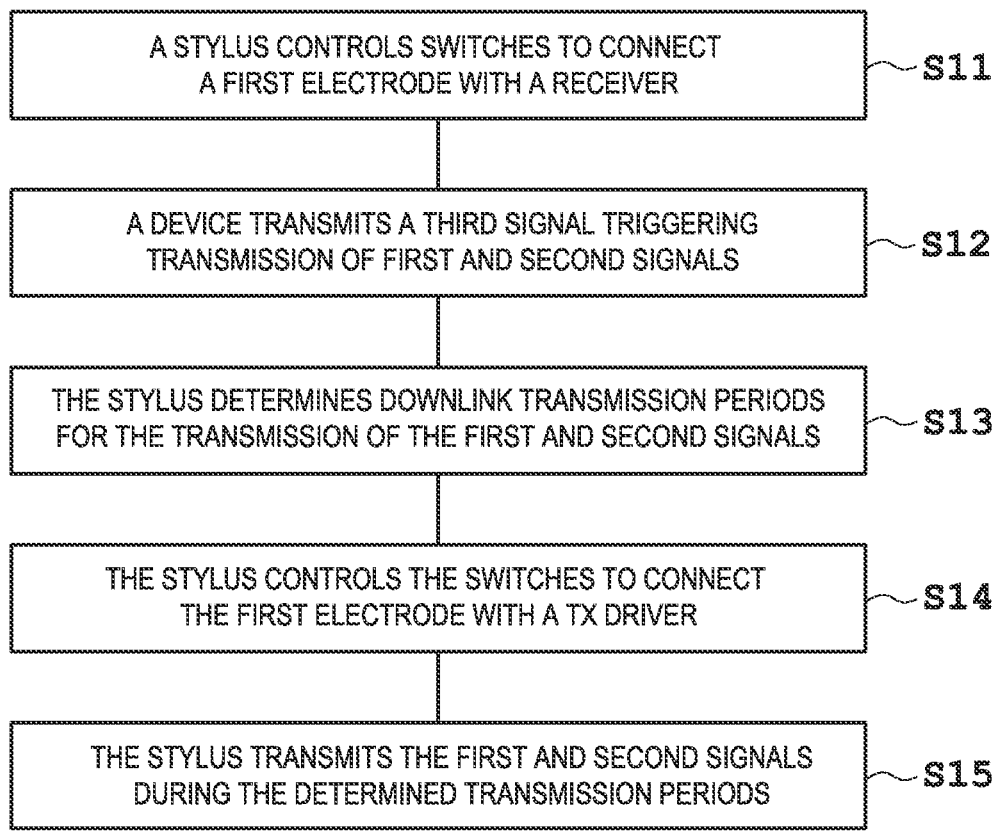
FIG. 12 is a flowchart for describing a communication method between the stylus and the device according to said another embodiment of the present disclosure.

Following describes a communication method between the stylus 10 and the device 20 according to the second method mentioned above with reference to FIG. 12. FIG. 12 is a flowchart for describing the communication method between the stylus and the device according to another embodiment of the present disclosure.

At a step S11, before receiving the third signal from the device 20, the stylus 10 controls the switches 101, 102 and 103 to connect the first electrode 11 with the receiver 15 and also cut off a path between the TX driver 14 and the first electrode 11.

At a step S12, the device 20 transmits the third signal triggering transmission of the first and second signals to the stylus 10, and the stylus 10 receives the third signal from the device 20 via both the first electrode 11 and the third electrode 13.

At a step S13, the stylus 10 determines the downlink transmission periods for transmission of the first and second signals according to reception of the third signal from the device 20.

At a step S14, the stylus 10 controls the switches 101, 102 and 103 to connect the first electrode 11 with the TX driver 14 and also cut off a path between the receiver 15 and the first electrode 11.

At a step S15, the stylus 10 transmits the first and second signals via the first electrode 11 and the second electrode 12 respectively during the determined downlink transmission periods. Since the device 20 can accurately recognize reception timing of the first and second signals during the downlink transmission periods, the device 20 may certainly receive and process the first and second signals even though an interval between adjacent downlink transmission periods is around 5 μs or less. This makes it possible to implement high temporal resolution on detection of the tip position and the tilt angle of stylus, thereby improving a writing performance.

The foregoing disclosure merely discloses exemplary embodiments, and is not intended to limit the protection scope of the present invention. It will be appreciated by those skilled in the art that the foregoing embodiments and all or some of other embodiments and modifications which may be derived based on the scope of claims of the present invention will of course fall within the scope of the present invention.

The invention claimed is:

1. A stylus capable of communicating with a device, the stylus comprising:
    a first electrode for transmitting a first signal to the device during a downlink transmission period, wherein the first electrode is located at a tip portion of the stylus;
    a second electrode for transmitting a second signal to the device during the downlink transmission period, wherein the second electrode is located apart from the first electrode; and
    a third electrode used for receiving a third signal from the device during an uplink transmission period, wherein the first electrode acts as a floating electrode during the uplink transmission period and the third electrode is located between the first electrode and the second electrode.

2. The stylus according to claim 1, wherein the third signal is used for triggering transmission of the first signal and the second signal.

3. The stylus according to claim 1, wherein the third signal carries information including at least one of frequency information or an identifier of a specific stylus corresponding to the device.

4. The stylus according to claim 1, wherein the second electrode has a ring shape, and the stylus further comprises a ground shield configured to be inside the second electrode.

5. The stylus according to claim 1, wherein a first period for transmission of the first signal and the second signal is separated from a second period for reception of the third signal.

6. The stylus according to claim 1, wherein a first frequency at which the first signal is transmitted is different from a second frequency at which the second signal is transmitted.

7. A method for communicating by a stylus with a device, the method comprising:
    receiving, by a third electrode of the stylus, a third signal from the device during uplink transmission periods;
    transmitting, by a first electrode of the stylus, a first signal to the device during downlink transmission periods, wherein the first electrode is located at a tip portion of the stylus and acts as a floating electrode during the uplink transmission periods; and
    transmitting, by a second electrode of the stylus, a second signal to the device during the downlink transmission periods, wherein the second electrode is located apart from the first electrode and the third electrode is located between the first electrode and the second electrode.

8. The method according to claim 7, wherein the third signal is used for triggering transmission of the first signal and the second signal.

9. The method according to claim 7, wherein the third signal carries information including at least one of frequency information and an identifier of a specific stylus corresponding to the device.

10. The method according to claim 7, further comprising:
    managing the first electrode to act as the floating electrode during the uplink transmission periods.

11. The method according to claim 7, wherein a first frequency at which the first signal is transmitted is different from a second frequency at which the second signal is transmitted.

12. A system comprising:
    a device; and
    a stylus, wherein the stylus comprises:
        a first electrode for transmitting a first signal to the device during a downlink transmission period, wherein the first electrode is located at a tip portion of the stylus;
        a second electrode for transmitting a second signal to the device during the downlink transmission period, wherein the second electrode is located apart from the first electrode; and
        a third electrode used for receiving a third signal from the device during an uplink transmission period, wherein the first electrode acts as a floating electrode during the uplink transmission period and the third electrode is located between the first electrode and the second electrode.

13. The system according to claim 12, wherein the third signal is used for triggering transmission of the first signal and the second signal.

14. The system according to claim 12, wherein the third signal carries information including at least one of frequency information or an identifier of a specific stylus corresponding to the device.

15. The system according to claim 12, wherein the second electrode has a ring shape, and the stylus further comprises a ground shield configured to be inside the second electrode.

* * * * *